(12) United States Patent
Lee

(10) Patent No.: US 7,070,290 B2
(45) Date of Patent: Jul. 4, 2006

(54) INPUT DEVICE

(75) Inventor: Ta-Yuan Lee, Taipei (TW)

(73) Assignee: Benq Corporation (TW)

( * ) Notice: Subject to any disclaimer, the term of this patent is extended or adjusted under 35 U.S.C. 154(b) by 58 days.

(21) Appl. No.: 10/727,597

(22) Filed: Dec. 5, 2003

(65) Prior Publication Data
US 2004/0109312 A1    Jun. 10, 2004

(30) Foreign Application Priority Data
Dec. 9, 2002    (TW) ................................ 91135531 A

(51) Int. Cl.
*G01D 11/28*    (2006.01)

(52) U.S. Cl. .................... 362/27; 362/231; 362/248; 362/293; 362/616; 116/279

(58) Field of Classification Search ............ 362/23–30, 362/84–85, 230–231, 251, 260, 293, 262, 362/236–237, 248, 616, 362; 116/279, 297
See application file for complete search history.

(56) References Cited

U.S. PATENT DOCUMENTS

| | | | | |
|---|---|---|---|---|
| 3,425,146 A | * | 2/1969 | Winstanley | .................... 40/581 |
| 4,012,632 A | * | 3/1977 | Stone | ............................. 362/23 |
| 4,947,291 A | * | 8/1990 | McDermott | ................... 362/19 |
| 5,063,379 A | * | 11/1991 | Fabry et al. | .................... 349/68 |
| 5,695,269 A | * | 12/1997 | Lippmann et al. | ............. 362/27 |
| 5,743,616 A | * | 4/1998 | Giuliano et al. | ............... 362/31 |
| 5,949,346 A | * | 9/1999 | Suzuki et al. | ........... 340/815.45 |
| 6,302,551 B1 | * | 10/2001 | Matumoto | .................... 362/27 |
| 6,419,372 B1 | * | 7/2002 | Shaw et al. | ................... 362/231 |
| 6,608,614 B1 | * | 8/2003 | Johnson | ....................... 345/102 |
| 6,761,462 B1 | * | 7/2004 | Yoshida | ....................... 362/109 |
| 6,786,617 B1 | * | 9/2004 | Lemay et al. | ............... 362/230 |
| 6,830,366 B1 | * | 12/2004 | Irie | ............................. 362/583 |
| 6,860,612 B1 | * | 3/2005 | Chiang et al. | ................ 362/29 |

FOREIGN PATENT DOCUMENTS

JP    10-39980    2/1998

OTHER PUBLICATIONS

English Language Abstract of Japanese Pat. Pub. 10-039980.

* cited by examiner

*Primary Examiner*—Alan Cariaso
*Assistant Examiner*—Jason Han
(74) *Attorney, Agent, or Firm*—Michael Bednarek; Pillsbury Winthrop Shaw Pittman LLP

(57) ABSTRACT

An input device allowing the user to quickly differentiate between the input states is provided. The input device includes a cap, a first light source, a second light source and a control module. The first light source radiates a first light of a first color and the second light source radiates a second light of a second color. The cap includes a first portion and a second portion. The first portion displays the light of the first light. The second portion displays the light of the second light. When the input device is in a first state, the control module controls the first light source to radiate the first light to illuminate the first portion. When the input device is in a second state, the control module controls the second light source to radiate the second light to illuminate the second portion.

8 Claims, 3 Drawing Sheets

INPUT DEVICE

CROSS REFERENCE TO RELATED APPLICATIONS

This Application claims priority to Taiwan Patent Application No. 091135531 entitled "Input Device," filed Dec. 9, 2002.

FIELD OF THE INVENTION

The present invention relates to an input device allowing users to quickly differentiate between the input states, and more particularly, to an input device of computers.

BACKGROUND OF THE INVENTION

Many electronic apparatus include input devices for inputting data. Input devices of, for example, a mobile phone, a desktop or a notebook, usually have several input modes, for example, English input mode, Chinese input mode and numeral input mode. Because users often are not aware of the current input mode when they input data, erroneous input or lowering of input speed occurs from time to time. Therefore, there is a need to provide input devices allowing users to quickly differentiate between the input states.

SUMMARY OF THE INVENTION

The present invention provides an input device allowing users to quickly differentiate between the input states and choose the input mode.

The input device of the present invention includes a first light source, a second light source, a control module and a cap. The control module controls the first light source and the second light source. The first light source emits a first light of a first color, and the second light source emits a second light of a second color. The cap has a first portion and a second portion; the first portion displays light of the first light source of the first color and the second portion displays light of the second light source of the second color. As the input device is in a first state, the control module controls the first light source to emit the first light to illuminate the first portion, and as the input device is in a second state, the control module controls the second light source to emit the second light to illuminate the second portion.

DETAILED DESCRIPTION OF THE INVENTION

The present invention provides an input device allowing users to quickly differentiate between the input states and choose the input mode. The input device can be for use with electronic apparatus such as a mobile phone, a desktop and a notebook. The embodiments of the present invention are disclosed in detail in the following.

The First Embodiment

Figure 1A:
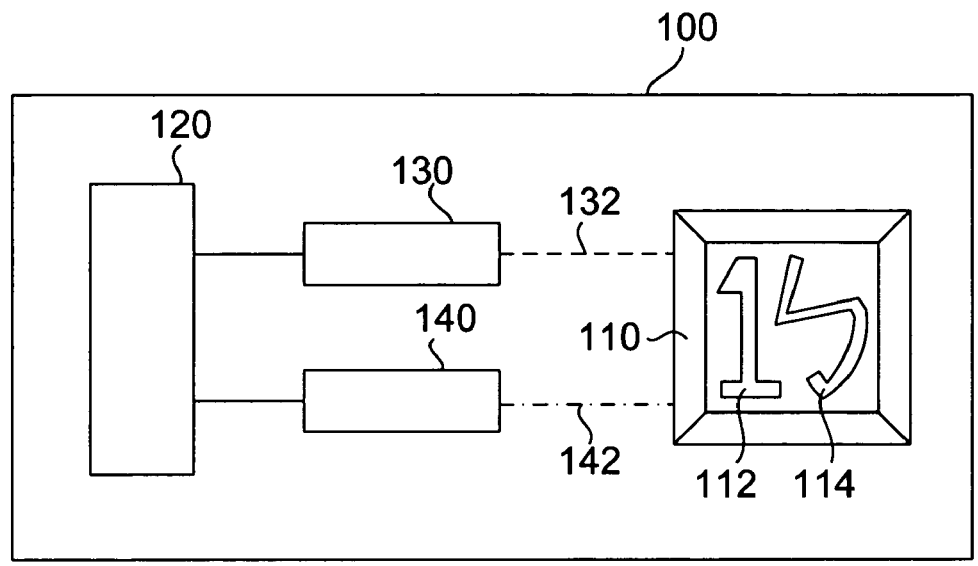
FIG. 1a shows a schematic diagram of a first embodiment of the input device of the present invention.

FIG. 1a shows a schematic diagram of the first embodiment of the input device of the present invention. The input device 100 includes at least a control module 120, a first light source 130, a second light source 140 and a cap 110. The first light source 130 emits a first light 132 of a first color, and the second light source 140 emits a second light 142 of a second color. The control module 120 controls the first light source 130 and the second light source 140. The cap 100 has a first portion 112 and a second portion 114. The first portion 112 allows most of the first light 132 to pass and blocks most of the second light 142; the second portion 114 allows most of the second light 142 to pass and blocks most of the first light 132. As the input device 100 is in a first state, the control module 120 controls the first light source 130 to emit the first light 132 to illuminate the first portion 112; as the input device 100 is in a second state, the control module 120 controls the second light source 140 to emit the second light to illuminate the second portion 114.

Figure 1B:
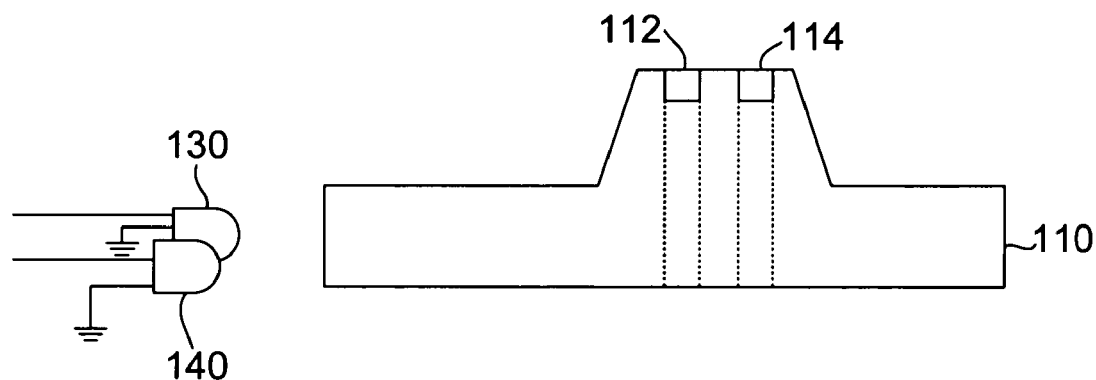
FIG. 1b shows a side view of the first embodiment of the input device of the present invention.

FIG. 1b shows a side view of the first embodiment of the input device of the present invention. The first portion 112 includes a first filter corresponding to the first color, and in another embodiment, the first portion 112 is made of a first fluorescence corresponding to the first color. The second portion 114 includes a second filter corresponding to the second color, and in another embodiment, the second portion 114 is made of a second fluorescence corresponding to the second color. The first light source 130 includes a first light emitting diode corresponding to the first color, and the second light source 140 includes a second light emitting diode corresponding to the second color.

The Second Embodiment

Figure 2:
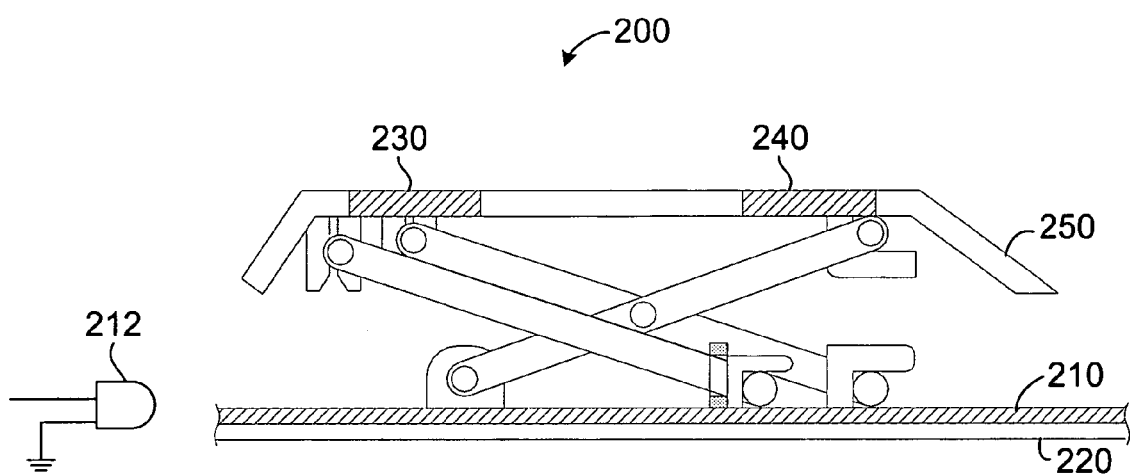
FIG. 2 shows a schematic diagram of a second embodiment of the input device of the present invention.

FIG. 2 shows a schematic diagram of the second embodiment of the input device of the present invention. Of all the parts of the input device 200, only the cap 250 is structurally different from the cap 110 in the first embodiment; the other parts are the same. The cap 250 has a first portion 230 and a second portion 240. The first portion 230 allows most of the first light 132 to pass and blocks most of the second light 142 and the second portion 240 allows most of the second light 142 to pass and blocks most of the first light 132. The cap 250 is connected to the light guide 210 and the light guide 210 is disposed on the substrate 220. The first light source 212 or the second light source (not illustrated) is controlled to emit light transmitted via the light guide 210 and passing out of the first portion 230 or the second portion 240 through the gaps in the structure of the cap 250. The first and the second portions here are filters, but in other embodiments the portions can be made of fluorescence material illuminating the light with corresponding color.

The Third Embodiment

Figure 3:
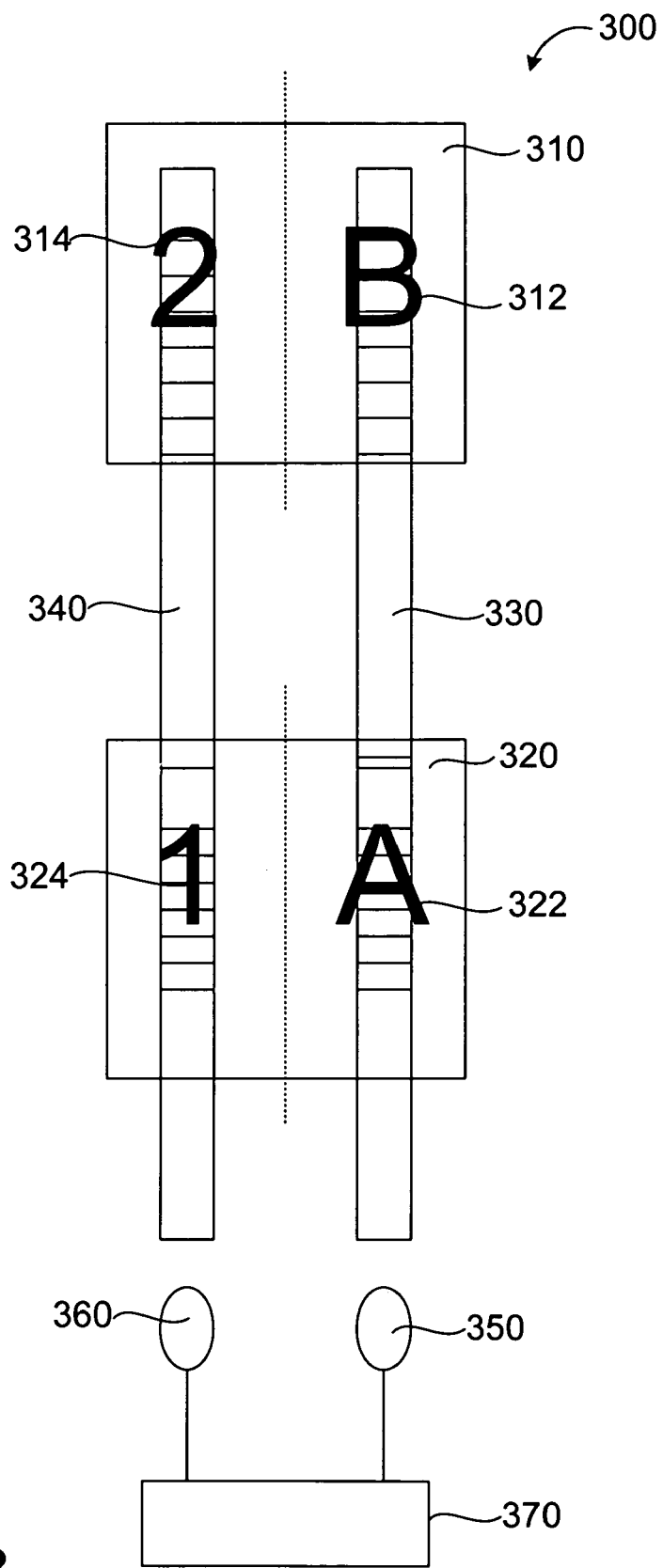
FIG. 3 shows a schematic diagram of a third embodiment of the input device of the present invention.

FIG. 3 shows a schematic diagram of the third embodiment of the input device of the present invention. The input device 300 includes a first cap 310, a second cap 320, a first light-guiding structure 330, a second light-guiding structure 340, a first light source 350, a second light source 360 and a control module 370. The first cap 310 includes a first portion 312 and a second portion 314, and the second cap 320 includes a first portion 322 and a second portion 324.

The first light-guiding structure 330 corresponds to the first portions 312 and 322 and the first light source 350 respectively. The second light-guiding structure 340 corresponds to the second portions 314 and 324 and the second light source 360 respectively. The control module 370 controls the first light source 350 and the second light source 360 to emit light. As the input device 300 is in a first state, the control module 370 controls the first light source 350 to emit light, and the light is transmitted to the first portions 312 and 322 via the first light-guiding structure 330 and passes through them. At this time, no light passes through the second portions 314 and 324, and users can easily determine that the input device 300 is in the first state according to the brightness of the first portions 312 and 322. As the input device 300 is in a second state, the control module 370 controls the second light source 360 to emit light, and the light is transmitted to the second portions 314 and 324 via the second light-guiding structure 340 and passes through them. At this time, no light passes through the first portions 312 and 322, and users can easily determine that the input device 300 is in the second state according to the brightness of the second portions 314 and 324. In this embodiment, the first light source 350 and the second light source 360 can be of the same color or not. The first and second portions here are filters, but in other embodiments the portions can be made of fluorescence material illuminating the light with corresponding color.

The input device 100, 200 and 300 of mentioned embodiments can be used for the keyboards of mobile phones or computers. When users want to input data, they can quickly determine the current input state by the colors shown on the portions of the caps to avoid erroneous input and lowering of input speed.

While the invention has been described in connection with what is presently considered to be the most practical and preferred embodiments, it is to be understood that the invention is not to be limited to the discovered embodiments. The invention is intended to cover various modifications and equivalent arrangement included within the spirit and scope of the appended claims.

The invention claimed is:

1. An input device, comprising:
   a first light guide;
   a second light guide;
   a first light source disposed aside the fist light guide, the first light source facing a sidewall of the first light guide for emitting a first light of a first color into the first light guide;
   a second light source disposed aside the second light-guide, the second light source facing a sidewall of the second light guide for emitting a second light of a second color into the second light guide;
   a cap being vertically movable disposed on the first light and second light guide, the cap having a first portion and a second portion above the first light guide and the second light guide respectively; and
   a control module selectively controlling the first light source and the second light source corresponding to a first state and a second state, whereby once the first light source emits the first light, the second light source is turned off, and once the second light source emits the second light, the first light source is turned off;
   wherein, as the input device is in the first state, the control module controls the first light source to emit the first light in a first direction, and the first light is guided by the first light guide to the first portion in a second direction; and
   as the input device is in the second state, the control module controls the second light source to emit the second light in the first direction, and the second light is guided by the second light guide to the second portion in the second direction, and wherein the second direction is substantially perpendicular to the first direction.

2. The input device according to claim 1, wherein the first portion further comprises a first filter corresponding to the first color allowing most of the first light to pass and substantially blocking the second light, and the second portion further comprises a second filter corresponding to the second color allowing most of the second light to pass and substantially blocking the first light.

3. The input device according to claim 1, wherein the first portion further comprises a first fluorescence corresponding to the first color, and the second portion further comprises a second fluorescence corresponding to the second color.

4. The input device according to claim 1, wherein the first light source includes a first light emitting diode corresponding to the first color, and the second light source includes a second light emitting diode corresponding to the second color.

5. An electronic device having an input device, the input device comprising:
   a light guide;
   a first light source disposed aside the light guide, the first light source facing a sidewall of the light guide for emitting the first light of a first color into the light guide;
   a second light source disposed aside the light guide, the second light source facing the sidewall of the light guide for emitting the second light of a second color into the light guide;
   a cap being vertically movable disposed above the light guide having a first portion and a second portion, featuring in that the first portion allows most of the first light to pass and substantially blocks the second light, and the second portion allows most of the second light to pass and substantially blocks the first light; and
   a control module selectively controlling the first light source and the second light source corresponding to a first state and a second state, whereby once the first light source emits the first light, the second light source is turned off, and once the second light source emits the second light, the first light source is turned off;
   wherein, as the input device is in a the first state, the control module controls the first light source to emit the first light in a first direction, and the first light is guided by the light guide to both the first portion and the second portion in a second direction, the first portion displaying more brightness than the second portion; and as the input device is in the second state, the control module controls the second light source to emit the second light in the first direction, and the second light is guided by the light guide to both the first portion and the second portion in the second direction, the second portion displaying more brightness than the first portion, and wherein the second direction is substantially perpendicular to the first direction.

6. The electronic device according to claim 5, wherein the first portion further comprises a first filter corresponding to the first color, and the second portion further comprises a second filter corresponding to the second color.

7. The electronic device according to claim 5, wherein the first portion further comprises a first fluorescence corresponding to the first color, and the second portion further comprises a second fluorescence corresponding to the second color.

8. The electronic device according to claim 5, wherein the first light source includes a first light emitting diode corresponding to the first color, and the second light source includes a second light emitting diode corresponding to the second color.

* * * * *